US012363172B2

(12) United States Patent
Kampen et al.

(10) Patent No.: US 12,363,172 B2
(45) Date of Patent: *Jul. 15, 2025

(54) SYSTEMS AND METHODS FOR CYBERSECURITY ANALYSIS AND CONTROL OF CLOUD-BASED SYSTEMS

(71) Applicant: State Farm Mutual Automobile Insurance Company, Bloomington, IL (US)

(72) Inventors: Dennis Kampen, Gibson City, IL (US); Michael J. Maier, Bloomington, IL (US)

(73) Assignee: State Farm Mutual Automobile Insurance Company, Bloomington, IL (US)

(*) Notice: Subject to any disclaimer, the term of this patent is extended or adjusted under 35 U.S.C. 154(b) by 34 days.

This patent is subject to a terminal disclaimer.

(21) Appl. No.: 18/466,540

(22) Filed: Sep. 13, 2023

(65) Prior Publication Data

US 2023/0421613 A1    Dec. 28, 2023

Related U.S. Application Data

(63) Continuation of application No. 17/343,473, filed on Jun. 9, 2021, now Pat. No. 11,882,155.

(51) Int. Cl.
*H04L 9/40* (2022.01)
(52) U.S. Cl.
CPC .......... *H04L 63/20* (2013.01); *H04L 63/1425* (2013.01)

(58) Field of Classification Search
CPC .......................... H04L 63/20; H04L 63/1425
See application file for complete search history.

(56) References Cited

U.S. PATENT DOCUMENTS

| 8,990,392 | B1 | 3/2015 | Stamos |
| 10,091,169 | B2 | 10/2018 | Cohen et al. |
| 10,484,334 | B1 | 11/2019 | Lee et al. |
| 10,686,791 | B1 | 6/2020 | Balmakhtar et al. |
| 10,795,709 | B2 | 10/2020 | Glessner et al. |
| 10,848,522 | B2 | 11/2020 | Prasad et al. |
| 11,882,155 | B1 * | 1/2024 | Kampen .............. H04L 63/1425 |

(Continued)

FOREIGN PATENT DOCUMENTS

| CN | 102932453 A | 2/2013 |
| CN | 102685180 B | 7/2015 |

(Continued)

*Primary Examiner* — Oleg Korsak
(74) *Attorney, Agent, or Firm* — Armstrong Teasdale LLP

(57) ABSTRACT

Provided herein is a computer system including at least one processor in communication with a memory. The at least one processor programmed to: (i) retrieve, from the memory, rules associated with running one or more applications on a third-party server, (ii) transmit a query to the third-party server to retrieve application data associated with the one or more applications run on the third-party server, (iii) compare the stored rules and the application data, (iv) determine, based upon the comparison, that at least one of the one or more applications does not conform to at least one of the rules, and (v) transmit a notification to a user associated with the at least one application including the rules that the at least one application is not in conformance with.

22 Claims, 8 Drawing Sheets

(56) References Cited

U.S. PATENT DOCUMENTS

| | | |
|---|---|---|
| 2012/0005724 A1 | 1/2012 | Lee |
| 2012/0011077 A1 | 1/2012 | Bhagat |
| 2013/0298242 A1 | 11/2013 | Kumar et al. |
| 2016/0224374 A1 | 8/2016 | Basu et al. |
| 2020/0382560 A1 | 12/2020 | Woolward et al. |

FOREIGN PATENT DOCUMENTS

| | | |
|---|---|---|
| CN | 105915535 B | 10/2017 |
| CN | 108848110 A | 11/2018 |
| CN | 108959972 A | 12/2018 |
| CN | 106878343 B | 9/2019 |
| CN | 112653697 A | 4/2021 |

* cited by examiner

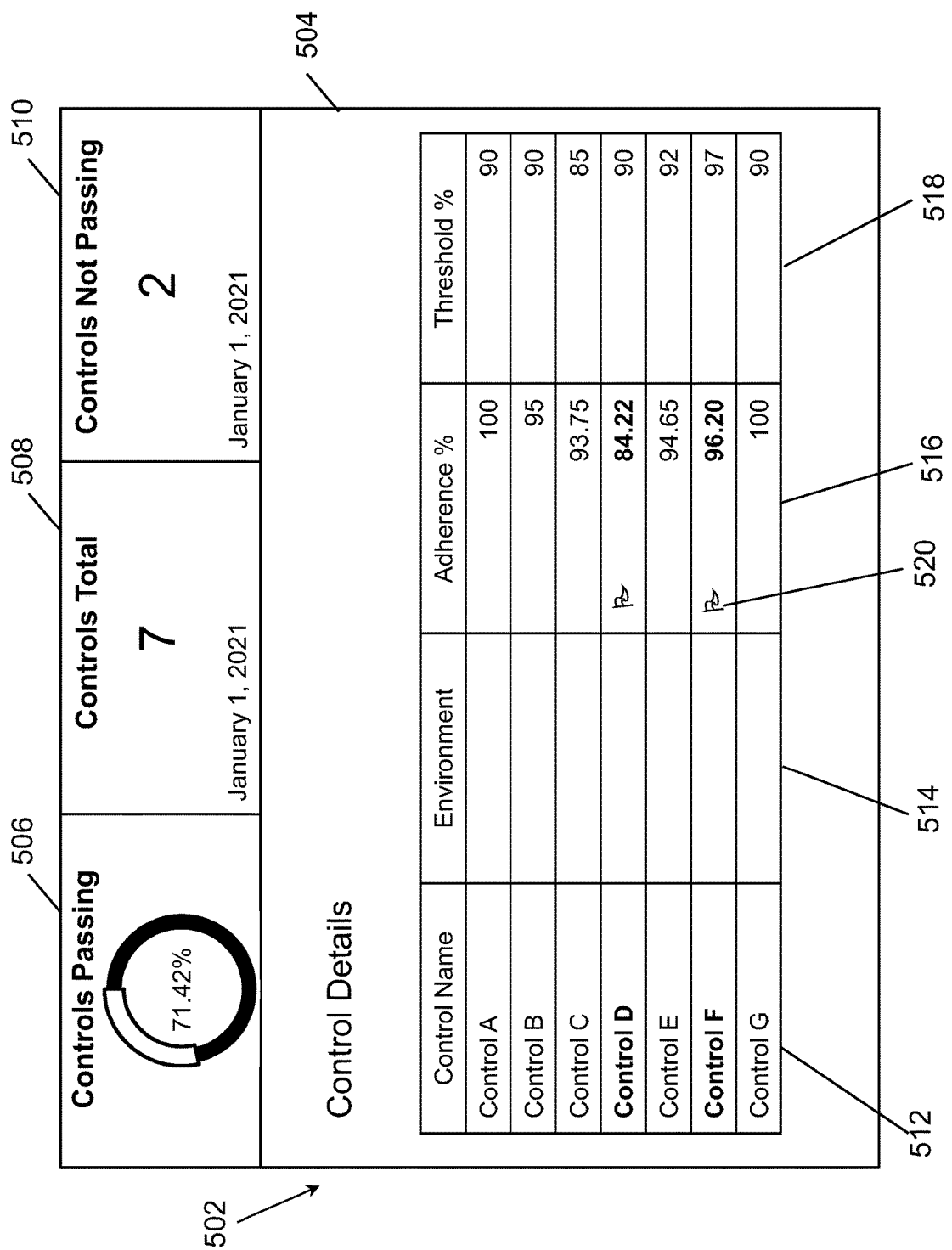

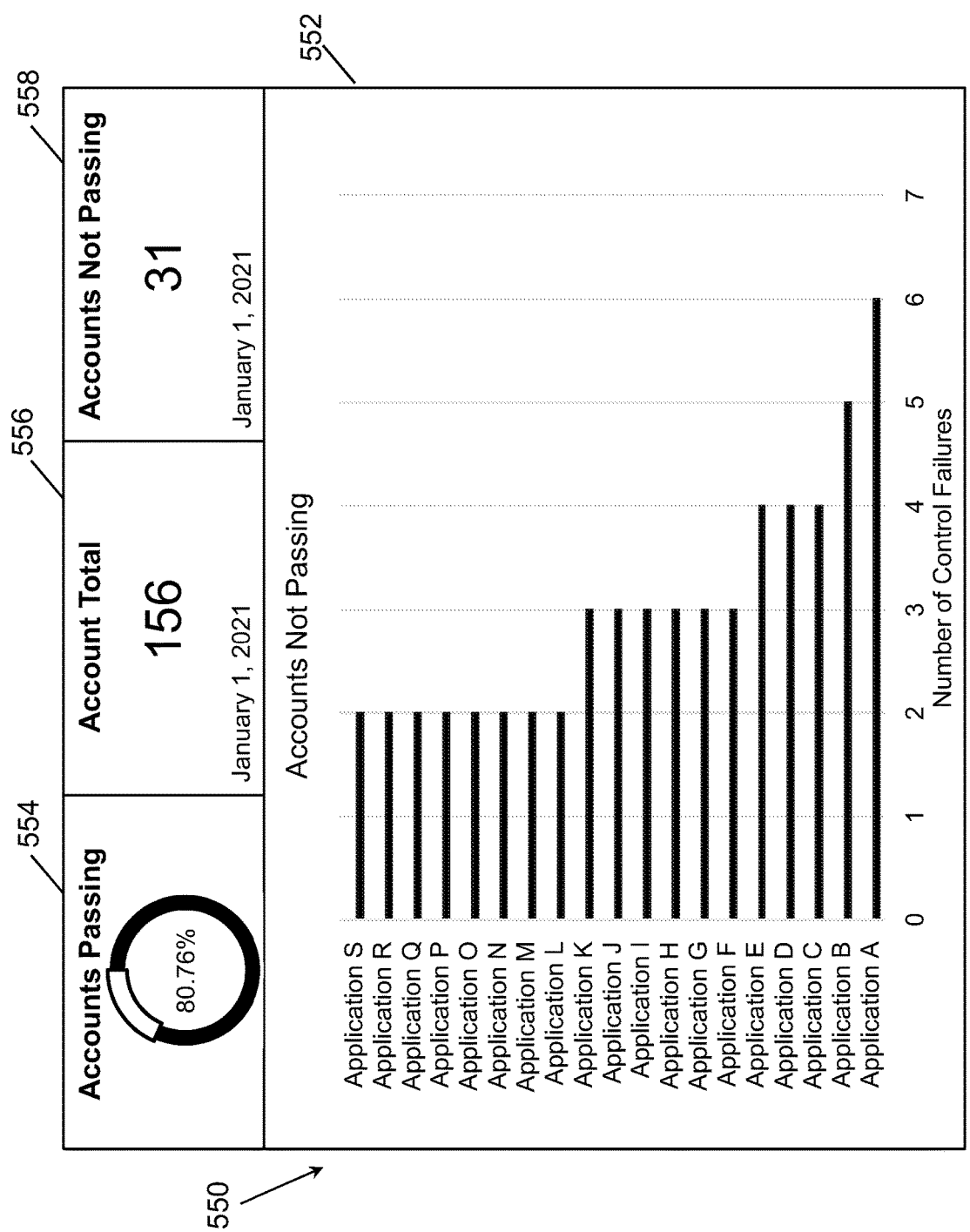

SYSTEMS AND METHODS FOR CYBERSECURITY ANALYSIS AND CONTROL OF CLOUD-BASED SYSTEMS

CROSS-REFERENCE TO RELATED APPLICATIONS

This application is a continuation of U.S. patent application Ser. No. 17/343,473, filed Jun. 9, 2021, the entire content and disclosure of which are hereby incorporated herein by reference in its entirety.

FIELD OF THE DISCLOSURE

The present disclosure relates to systems and methods for cybersecurity analysis and control, and more particularly, to systems and methods for automatic, near real-time, analysis and control of cloud-based systems including secure applications and data.

BACKGROUND

In many cases, users are turning to cloud services to provide remote computing servers to run applications. There are many benefits associated with these cloud services, especially because users no longer need to buy physical servers to run applications and can budget and pay for only the services that they will use, rather than paying for excess capacity. This provides the users with increased flexibility in their server environment and often provides cost-savings. However, there are downsides to cloud services for remote computing. For example, remotely running applications may come with increased security risk of vulnerabilities, especially with regards to the applications configurations. While the cloud servicers may be responsible for security of the data centers housing the remote servers, users are typically responsible for the security of the information that they upload to the cloud. Ensuring the security of the data in the cloud is often a manual process that is generally based on opinions of professionals rather than codified rules. Further, in large companies, it may be hard to tell which applications need to be focused on for cybersecurity vulnerability remediation, and managers of the applications may be unaware of security issues associated with their applications. Additionally, the National Institute of Standards and Technology (NIST) requires that all companies protect their network, without describing exactly how. Accordingly, it would be desirable to make security solutions accessible to developers who are working on business solutions for the company.

BRIEF SUMMARY

The present embodiments may relate to systems and methods for automatic, near real-time, analysis and control of cloud-based systems including secure applications and data. In one aspect, a system for cybersecurity analysis and control is provided. In some exemplary embodiments, the system includes a computer system including at least one processor in communication with a memory.

In one aspect, a computer system may be provided. The computer system may include at least one processor in communication with a memory. The at least one processor may be programmed to: (i) retrieve, from the memory, rules associated with running one or more applications on a third-party server, (ii) transmit a query to the third-party server to retrieve application data associated with the one or more applications run on the third-party server, (iii) compare the stored rules and the application data, (iv) determine, based upon the comparison, that at least one of the one or more applications does not conform to at least one of the rules, and (v) transmit a notification to a user associated with the at least one application including the rules that the at least one application is not in conformance with. The computer system may include additional, less, or alternate functionality, including that discussed elsewhere herein.

In another aspect, a method may be provided. The method may be implemented by a computer device including at least one processor in communication with a memory. The method may include: (i) retrieving, from the memory, rules associated with running one or more applications on a third-party server, (ii) transmitting a query to the third-party server to retrieve application data associated with the one or more applications run on the third-party server, (iii) comparing the stored rules and the application data, (iv) determining, based upon the comparison, that at least one of the one or more applications does not conform to at least one of the rules, and (v) transmitting a notification to a user associated with the at least one application including the rules that the at least one application is not in conformance with. The method may include additional, less, or alternative actions, including those discussed elsewhere herein.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein:

FIG. 5B illustrates an exemplary controls panel of the dashboard configuration of FIG. 5A.

FIG. 5C illustrates an exemplary accounts panel of the dashboard configuration of FIG. 5A.

Figure 1:
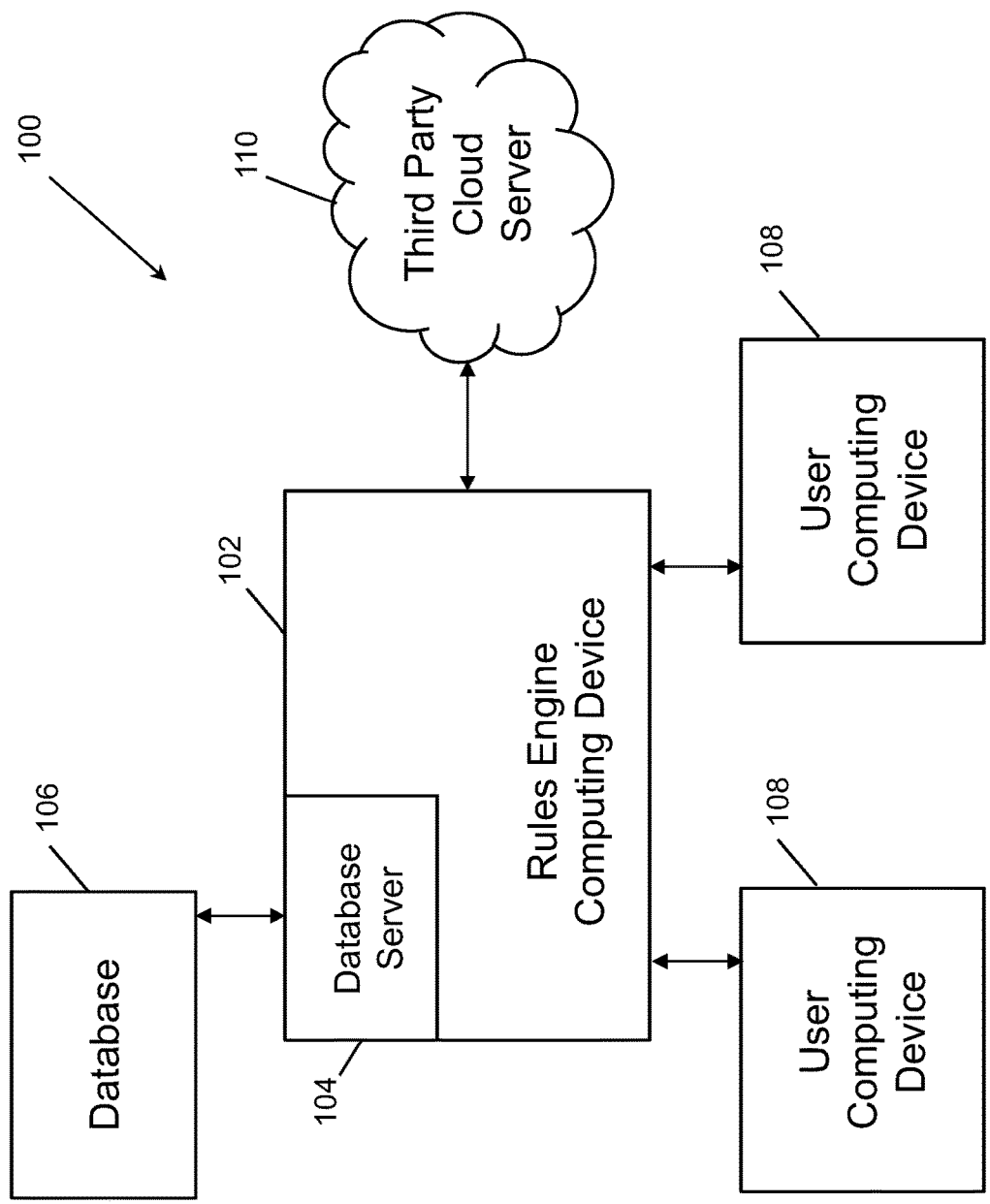
FIG. 1 illustrates an exemplary computer system in accordance with an exemplary embodiment of the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for cybersecurity analysis and control, and more particularly, to systems and methods for automatic, near real-time, analysis and control of cloud-based systems including secure applications and data. In one exemplary embodiment, the process may be performed by one or more computing devices, such as a rules engine computing device.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

The five characteristics are: on-demand self-service, broad network access, resource pooling, rapid elasticity, and measured service. On-demand self-service refers to the capability for a cloud consumer to unilaterally provision computing capabilities, such as server time and network storage, as needed automatically without requiring human interaction with the service's provider.

Broad network access refers to capabilities being available over a network and accessed through standard mechanisms that promote use by heterogeneous thin or thick client platforms (e.g., mobile phones, laptops, and PDAs).

Resource pooling refers to the provider's computing resources being pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity includes that capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service includes where cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The three service models include: software as a service (SaaS), platform as a service (PaaS), and infrastructure as a service (IaaS).

Software as a Service (SaaS) includes where the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities with the possible exception of limited user-specific application configuration settings.

Platform as a Service (PaaS) includes where the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS) includes where the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The four deployment models include: private cloud, community cloud, public cloud, and hybrid cloud.

Private cloud refers to a cloud infrastructure that is operated solely for an organization. It may be managed by the organization or a third party and may exist on-premises or off-premises.

A community cloud is a cloud infrastructure that is shared by several organizations and supports a specific community that has shared concerns (e.g., mission, security requirements, policy, and compliance considerations). It may be managed by the organizations or a third party and may exist on-premises or off-premises.

A public cloud is a cloud infrastructure that is made available to the general public or a large industry group and is owned by an organization selling cloud services.

In a hybrid cloud the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Turning now to an overview of technologies that are more specifically relevant to aspects of the disclosure, with the emergence and prevalence of remote cloud-based computing services, many companies and/or enterprises now use cloud-based computing services to run applications. For example, insurance companies may use cloud-based computing services to run applications associated with storing and analyzing driver telematics data for insurance purposes. The cloud-based computing services allow the companies to upload and run all of their applications without the companies having to purchase physical servers. Furthermore, the cloud-based computing services allow the companies and/or enterprises to scale up or down their services based on demand. This allows the companies to only purchase the amount of computing power they need and not have to worry about maintaining physical servers.

While there are many advantages of remote cloud computing for companies, there are also downsides. Specifically, any time data and/or applications are uploaded and stored remotely, the greater the potential for security vulnerabilities that may lead to security breaches and leaks of the data and/or applications. The users, not the cloud services themselves, are generally responsible for the security of their applications and associated data. This can create a hurdle for companies and users associated with the companies (e.g., employees, management, developers, etc.) in terms of cybersecurity management for the cloud-based applications. Currently, many companies have cybersecurity risk management panels that go through each cloud-based application and the security features of the application to determine whether the cybersecurity risks associated with potential vulnerabilities and exploits associated with the application is sufficiently low or if the application needs to be reconfigured to remove the vulnerabilities and thus remediate the associated cybersecurity vulnerabilities. The current process is long, manual, error-prone, and mostly opinion-based instead of data-based. In addition, there are usually more developers coding new applications and business use cases that interact with at least some of the cloud-based services. These developers may not be fully aware of all of the cybersecurity rules set by the company. Furthermore, it may take significant time to keep each developer up to date with all of the cybersecurity rules. Additionally, it is important for testing systems to be consistent when scanning for cybersecurity issues, accordingly, in many cases it is better for these tests to be run automatically by a computer rather than manually. Automatic testing allows for consistent and efficient testing, where everything may be tested in a constant manner for every test. Furthermore, this reduces any potential bias introduced by an individual human tester or group of testers.

The systems and methods described herein solve many of the problems associated with current cybersecurity assessment strategies. Specifically, the rules engine computing system automates the cybersecurity assessment and management such that the cybersecurity assessment is data-based. That is, instead of getting a panel together to come up with opinions regarding the security of cloud-based applications, cybersecurity controls associated with different aspects of each application are codified into rules, and the rules are consistently checked against the applications to ensure that the applications are in conformance with the rules. For example, it may be codified in rules that any applications that store or use personally identifiable information (PII) of users must encrypt the data to a certain standard, that all cloud-based applications must require users (e.g., developers and/or managers) associated with the application to change their account password every 90 days, and that all cloud-based applications must be accessed separately such that if there were a breach, the bad actor of the breach would only have access to one application instead of multiple applications. The rules may be input to the rules engine computing device by users associated with the cloud-based applications, and the rules engine computing device may create the rules based upon the input. The rules input by the users may be company-specific rules and/or may be based upon national standards (e.g., from the National Institute of Security Technology, NIST). As used herein, "control(s)" and "rule(s)" are both directed to any security features that should be present in applications.

In the exemplary embodiments, the rules are based on control objectives set by the company or security administrators. The control objectives are broken down into settings services the cloud-based applications and services. These settings are used as the basis for the rules. The settings are then tested in the cloud-based applications and services by using application programming interfaces (APIs) provided by the cloud systems to determine what the current settings are in the cloud-services and applications and if those settings match or follow the required settings from the rules. Furthermore, control objectives and/or settings may be for the entire enterprise or company. Control objectives may also be applied to specific departments or portions of the enterprise. These department level control objectives may only be tested on applications associated with the specific department or portion of the enterprise. In some embodiments, the control objectives are distilled down into the individual rules that may be tested for. For example, when a new application is developed, the new application may have multiple control objectives applied to it. Then the tests associated with those control objectives may be used to test the application.

The rules engine computing device may receive all application data from a third-party cloud server (e.g., associated with a remote cloud computing service) associated with the applications run on the cloud. The application data may include, for example, an environment on which the application is run, types of data stored through the application, encryption data associated with data stored by the application, and permissions data associated with users that can access the application. The rules engine computing device may then determine, based upon the application data, which rules apply to each application. The rules engine computing device may scan the application data frequently (e.g., each hour, every two hours, every 12 hours, every 24 hours, every week, etc.) to ensure that the applications stay in conformance with the applicable rules. Further, each time a triggering event occurs (e.g., a user makes changes to an application such as settings or configuration, a user deploys a new aspect of an application, one or more rules are updated, one or more rules are newly input, etc.), the rules engine computing device may scan the application data to ensure that the applications are still in conformance with the applicable rules. For example, the rules engine computing device may generate and transmit a query to the third-party cloud server requesting the application data of the applications. Once the rules engine computing device receives the application data from the third-party cloud server, the rules engine computing device may compare the application data of each application with the rules applicable to the respective application.

In the exemplary embodiment, the rules engine computing device uses APIs to access the cloud-based systems and services to determine the current settings for the cloud-based applications. The rules engine computing device compares the current settings to one or more stored rules to determine if the current settings match the rules. The settings may be for an application or for data. For example, the rules engine computing device may scan all of the data at rest to ensure that the data is properly encrypted. This may include sampling the data to see if it is encrypted. The rules engine computing device may also scan the settings for the data itself to see if the data is set to be encrypted when store and/or decrypted when used.

The rules engine computing device may then determine, based upon the comparison, whether each application is in conformance with each rule associated with the application. If the application is in conformance with each rule associated with the application, the rules engine computing device may include a message in the application data that the application is in conformance with all applicable rules as of the time and date that the rules engine computing device determined the conformance. If the application is not in conformance with any of the rules associated with the application, the rules engine computing device may flag the application and the one or more rules with which that the application is not in conformance. For example, if an application stores PII and the rules engine computing device determines, based upon the comparison of the application data and the rules, that the application data does not properly encrypt the PII, the rules engine computing device may flag the application (e.g., by adding a flag to the application data) and the encryption rule as the rule with which the application is not in conformance.

Further, if it is determined (e.g., by the rules engine computing device) that an application is not in conformance with one or more rules associated with the application, the rules engine computing device may determine a potential vulnerability associated with each rule with which the application is not in conformance. The priority of the potential vulnerability may be based upon data submitted with the rule (e.g., rules may be labeled "highly important," "important," etc. when the rules are input to the rules engine computing device by the user), or the rules engine computing device may automatically determine a priority for each potential vulnerability associated with the rule. For example, if the rule is associated with data security and setting up environments that are hard to breach, the rule may be considered very high priority potential vulnerability if the rule is not conformed to. If the rule is associated with user logins, the rule may be considered low priority potential vulnerability if the rule is not conformed to. In general, the more vulnerable not being in conformance with the rule makes the application, the higher the priority associated with the rule and the corresponding potential vulnerability.

The rules engine computing device may then notify one or more individuals and/or computers that the rule is not being conformed to. In some embodiments, the rules engine computing device transmits notifications when the violation of the rule is first seen. The rules engine computing device may also transmit notifications at other points, such as in a daily summary of notifications, one or more escalation notifications, and/or when remediation has or will occur. The base notifications may be sent to an application owner or developer associated with the application that failed. The escalation notifications refer to notifications transmitted to a supervisor after a period of time has elapsed since the violation was first seen and has not been remedied. The remediation notification refers to a notification that the issue has been remediated, either by the developer, a cybersecurity professional and/or the rules engine computing device.

Based upon the determined priority associated with the application not being in conformance with one or more rules associated with the application, the rules engine computing device may determine an amount of time that a user associated with the application has to fix the application such that the potential vulnerability is remediated. The user may include a manager of the application, a supervisor of the application, and/or a developer or contributor to the application. The determined time period is dependent on the priority associated with the rule and/or the potential vulnerability. For example, high-priority rules may need to be fixed in 48 hours, whereas low-priority rules may need to be fixed in two weeks. If the time period is exceeded without the potential vulnerability being resolved, the rules engine computing device may escalate the issue and transmit notifications to one or more supervisors or managers that the potential vulnerability has not been resolved. The rules engine computing device accesses a database to determine who to notify for each rule and account where a violation may occur. In many cases, these two groups of individuals may have some overlap.

The rules engine computing device may transmit a notification to one or more users associated with the application that the application is not in conformance with one or more rules associated with the application. The notification may include the time period within which the user must fix the application, as determined by the rules engine computing device. The notification may be in any suitable form including, for example, an email, a push notification, a notification on a dashboard of the user, etc. In some embodiments, the rules engine computing device may send the notification to each user associated with the application. In other embodiments, the rules engine computing device may only send the notification to a manager or supervisor of the application.

In some embodiments, the notification may include information for the developer to use in repairing the application or settings to stop the violation of the rules. The notification may include test information describing the test that failed, evidence show that the test failed, tags of information of the actors and/or code (such as server names, workgroup details, and other information), number of times that the test has failed, when was the first failure of this test in this instance, when the escalation notification would be sent, and when a cybersecurity professional or the rules engine computing device may automatically remediate the issue.

In subsequent scans of the third-party cloud server, the rules engine computing device may determine whether the application has been fixed by one or more users such that the application is in conformance with the noted rules. If the rules engine computing device determines that the application has not been fixed by the users in the allotted time period, the rules engine computing device may send a notification to management indicating that the application was not fixed in the allotted time period. The rules engine computing device may also store the notifications that were sent such that there is a record of the non-conformance being found and no actions to fix the application being taken.

In some embodiments, the rules engine computing device may automatically fix errors in the applications that are not in conformance with one or more rules. For example, if the rule with which the application is not in conformance is that the application includes an open bucket when the bucket should be closed, the rules engine computing device may automatically close the bucket such that the application is in conformance with each rule with which the application is associated. Further, the rules engine computing device may learn, using machine learning and/or artificial intelligence techniques how users fix flagged applications. The rules engine computing device may input the user fixes into a model such that the rules engine computing device can predict how future users will fix flagged applications and potential vulnerabilities. Accordingly, as the rules engine computing device is used to flag and notify non-conforming applications, the rules engine computing device can learn ways to automatically fix the flagged applications such that eventually, minimal user input is required. The rules engine computing device may use on of different methods to repair or remediate the issue, these include fixing the issue, quarantining the resources associated with the issue, and/or deleting the resources associated with the issue. Fixing the issue may include changing one or more settings to the proper values. In these embodiments, the developer, cybersecurity professional, and/or the rules engine computing device may have information to provide context of the application and thus understand enough about the application and its use to properly change the settings to allow the application to continue to run. The rules engine computing device may quarantine the resources associated with the application when the rules engine computing device needs additional information about the application before changing the settings. This may include business related information about the application and/or context information. The rules engine computing device may delete the resources associated with the violation when the resources are unused by any application and include one or more known vulnerabilities.

While it may be useful for a cybersecurity professional or the rules engine computing device to repair an issue, this may only be a temporary patch of the issue. In some cases, the incorrect settings of an application may contradict the fixed settings and change those settings back to their incorrect values when the application is executed. Accordingly, the application itself may need to be corrected to keep the application in compliance going forward.

The rules engine computing device is further configured to generate and display (e.g., through a user computing device) a dashboard including rule data (e.g., controls panel, as described below) and application data (e.g., accounts panel, as described below) associated with each application of a user. For example, when the user signs into an account associated with the rules engine computing device, the rules engine computing device may display data associated with the applications of the user. Specifically, the rules engine computing device may display rules associated with the applications of the user and whether a threshold number of applications are in conformance with the rules, as described further herein. Further, the rules engine computing device may display the applications associated with the user and how many rules with which each application is not in conformance, as described further herein. The dashboard may also display pending notifications to the user and the time period that the user has to fix any applications. Accordingly, the rules engine computing device generates a customized dashboard to be displayed to the user that allows users to quickly and easily view any problems with their applications that need to be fixed.

The rules engine computing device may have additional rules input into the rules engine computing device. That is, the rules engine computing device can be used for additional services other than cybersecurity assessment and vulnerability mitigation for cloud-based applications. For example, rules may be input into the rules engine computing device associated with efficient usage of the third-party cloud server to save costs and make the applications run more efficiently. The rules may include a range of usage that each cloud server should be running at (e.g., 30% to 80%), a time period in which unused servers should be turned off, and other rules associated with the third-party cloud server. The rules engine computing device may query the third-party cloud server for server data associated with the servers on which the applications are run. The rules engine computing device may compare the server rules and the server data to determine whether each server is operating within the server rules. If the rules engine computing device determines that the server is not operating within the server rules, the rules engine computing device may flag the server in a similar manner to which the rules engine computing device flags an application, as described above. For example, the rules engine computing device may determine that a server has not been in use for 12 hours, while the server rules may include instructs that the rules engine computing device to deactivate any server that has not been in use for 24 hours. The rules engine computing device may flag the server and send a notification to the user associated with the server. If the server still has not been used in another 12 hours, the rules engine computing device may automatically turn off the unused server according to the server rules.

Further, the rules engine computing device may be used for auditing purposes. The rules engine computing device may store historical configurations of applications and any notifications including rules with which the applications were not in conformance. If one or more applications are audited by an auditor (e.g., an internal auditor, a regulation agency auditor, etc.) the rules engine computing device can retrieve historical configurations of the one or more applications and the rules associated with the one or more applications. Further, the rules engine computing device may display the configuration data, rule data, and application data associated with the applications to the auditor through a dashboard substantially similar to the dashboard described above. Accordingly, instead of an auditor having to go through hundreds of pieces of paper and opinions of professionals to audit one or more applications, the rules engine computing device allows the auditor to quickly and efficiently view all information needed for the audit. That is, the auditor can view the generated dashboard and see what rules with which the applications are not in compliance, which applications are not in compliance with the largest number of rules, the notifications associated with the non-conforming applications, etc. In further embodiments, the rules engine computing device also can generate one or more audit reports for the auditor. The audit report can include information including the rules being applied to each application and the history of how the application has complied with those rules. This would allow an auditor to tell how each application complies with each control objective, as the auditor and the rules engine computer device trace the linkage between each test and the corresponding control objective.

In additional embodiments, the rules engine computing device may be used as a sandbox testing environment for new applications. The rules engine computing device may test the settings and/or execution of the application to determine if the application is in compliance with the rules without the application being connected to the third-party cloud server. This sandbox-based testing allows the developer to catch violations and/or issues before introducing those errors to the third-party cloud server.

For example, when a new application is developed, the new application may have multiple control objectives applied to it. Then the tests associated with those control objectives may be used to test the application.

As used herein, "applications" and "accounts" refer to any cloud-based computer-implemented system of components that stores, analyzes, displays, and/or processes data in any way.

As used herein, "cloud-based services," "third-party cloud servers," "cloud computing devices," and "remote computing servers" refer to any remote processing servers or services that allow users to upload and run applications of the users remotely. For example, third-party cloud servers may include servers of or associated with AMAZON WEB SERVICES (AWS), GOOGLE CLOUD PLATFORM (GCP), and/or MICROSOFT AZURE.

Exemplary technical effects of the systems, methods, and articles of manufacture described herein may include, for example: (a) automating cybersecurity assessment processes that are typically manual processes; (b) automatically remediating cybersecurity vulnerabilities associated with cloud-based applications; (c) tracking user remediations of cybersecurity vulnerabilities such that the applications can be quickly and efficiently fixed; (d) providing a user-friendly dashboard for users to quickly view which applications associated with the users are in conformance with rules, and which applications are not in conformance with rules; (e) providing a dashboard that quickly and efficiently allows auditing of the applications; and (f) improving cloud usage based upon information received from the cloud server associated with application and servers running the applications.

Exemplary Computer System

FIG. 1 depicts a simplified block diagram of an exemplary computer system 100. In the exemplary embodiment, system 100 may be used for determining whether applications are in conformance with rules and displaying information about applications and associated rule-conformance to users associated with the applications. In the exemplary embodiment, system 100 may include a rules engine computing device 102 and a database server 104. Rules engine computing device 102 may be in communication with one or more databases 106 (or other memory devices), user computing devices 108, and/or third-party cloud servers 110.

In the exemplary embodiment, user computing devices 108 may be computers that include a web browser or a software application, which enables user computing devices 108 to access remote computer devices, such as rules engine computing device 102, using the Internet or other network. In the exemplary embodiment, the rules engine computing device 102 may analyze systems, applications, and/or data against a plurality of stored rules to determine if the analyzed systems, applications, and/or data may violate one or more of those rules and thus lead to potential cybersecurity vulnerabilities.

In the exemplary embodiments, the rules are based on control objectives set by the company or security administrators. The control objectives are distilled into settings for the cloud-based applications and services. These settings are used as the basis for the rules. The settings are then tested in the cloud-based applications and services by using application programming interfaces (APIs) provided by third-party cloud servers 110 to determine what the current settings are in the cloud-services and applications and if those settings match or follow the required settings from the rules. Furthermore, control objectives and/or settings may be for the entire enterprise or company. Control objectives may also be applied to specific departments or portions of the enterprise. These department level control objectives may only be tested on applications associated with the specific department or portion of the enterprise.

More specifically, user computing devices 108 may be communicatively coupled to rules engine computing device 102 through many interfaces including, but not limited to, at least one of the Internet, a network, such as the Internet, a local area network (LAN), a wide area network (WAN), or an integrated services digital network (ISDN), a dial-up-connection, a digital subscriber line (DSL), a cellular phone connection, and a cable modem. User computing devices 108 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In some embodiments, user computing devices 108 may transmit data to rules engine computing device 102 (e.g., user data including a user identifier, applications associated with a user, etc.). In further embodiments, user computing devices 108 may be associated with users associated with an insurance provider.

A third-party cloud server 110 may be communicatively coupled with rules engine computing device 102. In some embodiments, third-party cloud server 110 may be associated with, or is part of a computer network associated with, a third-party that offers cloud computing and/or remote server services. For example, users associated with user computing devices 108 may upload one or more accounts or applications to be run remotely on third-party cloud server 110. In other embodiments, third party device 110 may be associated with another third party and is merely in communication with the cloud offering third-party's computer network. More specifically, third-party cloud server 110 is communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Third-party cloud server 110 may be any cloud-based server accessible by any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

Third-party cloud server 110 provides cloud-based services and resources to applications that may be executed on user computing devices 108. In the exemplary embodiment, third-party cloud server 110 provides infrastructure as a service (IaaS) to the applications executed by user computing devices 108 and rules engine computing device 102. Rules engine computing device 102 is programmed to analyze the services and resources provided to and used by the applications to ensure that the settings of those services and resources comply with the control objectives of the enterprise as defined by a plurality of rules. The plurality of rules may be stored in database 106.

In the exemplary embodiment, rules engine computing device 102 uses APIs to access the third-party cloud servers 110 and their services to determine the current settings for the cloud-based applications. Rules engine computing device 102 compares the current settings to one or more stored rules to determine if the current settings match the rules. The settings may be for an application or for data. For example, the rules engine computing device may scan all of the data at rest to ensure that the data is properly encrypted. This may include sampling the data to see if it is encrypted. The rules engine computing device may also scan the settings for the data itself to see if the data is set to be encrypted when store and/or decrypted when used.

If the application is not in conformance with any of the rules associated with the application, rules engine computing device 102 may flag the application and the one or more rules with which that the application is not in conformance. For example, if an application stores PII and rules engine computing device 102 determines, based upon the comparison of the application data and the rules, that the application data does not properly encrypt the PII, rules engine computing device 102 may flag the application (e.g., by adding a flag to the application data) and the encryption rule as the rule with which the application is not in conformance.

In some embodiments, the database 106 also stores a catalog of the resources being provided by the third-party cloud server 110 and provides tagged information about those resources. In one embodiment, the tagged information may include the priority associated with data stored on the cloud. For example, some data may include cafeteria menu information and has a low priority, where data with PII would have a higher priority. The different priorities of data may be encrypted at different levels and/or with different keys.

Database server 104 may be communicatively coupled to database 106 that stores data. In one embodiment, database 106 may include application data, rules, application rule conformance data, etc. In the exemplary embodiment, database 106 may be stored remotely from rules engine computing device 102. In some embodiments, database 106 may be decentralized. In the exemplary embodiment, a user may access database 106 and/or rules engine computing device via user computing device 108.

In some embodiments, the different rules stored in database 106 may be divided into categories. These rules may be categorized based on the corresponding control objective. Furthermore, rules engine computing device 102 may divide the rules into different buckets and/or categories to allow multiple tests to be executed simultaneously. Rules engine computing device 102 may have third-party cloud server 110 execute the tests in parallel using processing resources provided by third-party cloud server 110.

Rules engine computing device 102 may be in communication with a plurality of user computing devices 108 and third-party cloud servers 110 to determine whether applications are in conformance with rules and display information about applications and associated rule-conformance to users associated with the applications. In some embodiments, rules engine computing device 102 may be associated with an insurance provider and/or a related company, or be in communication with the insurance provider's or other company's computer network (not shown).

Exemplary Process for Automated Cybersecurity Assessment and Control

Figure 2:
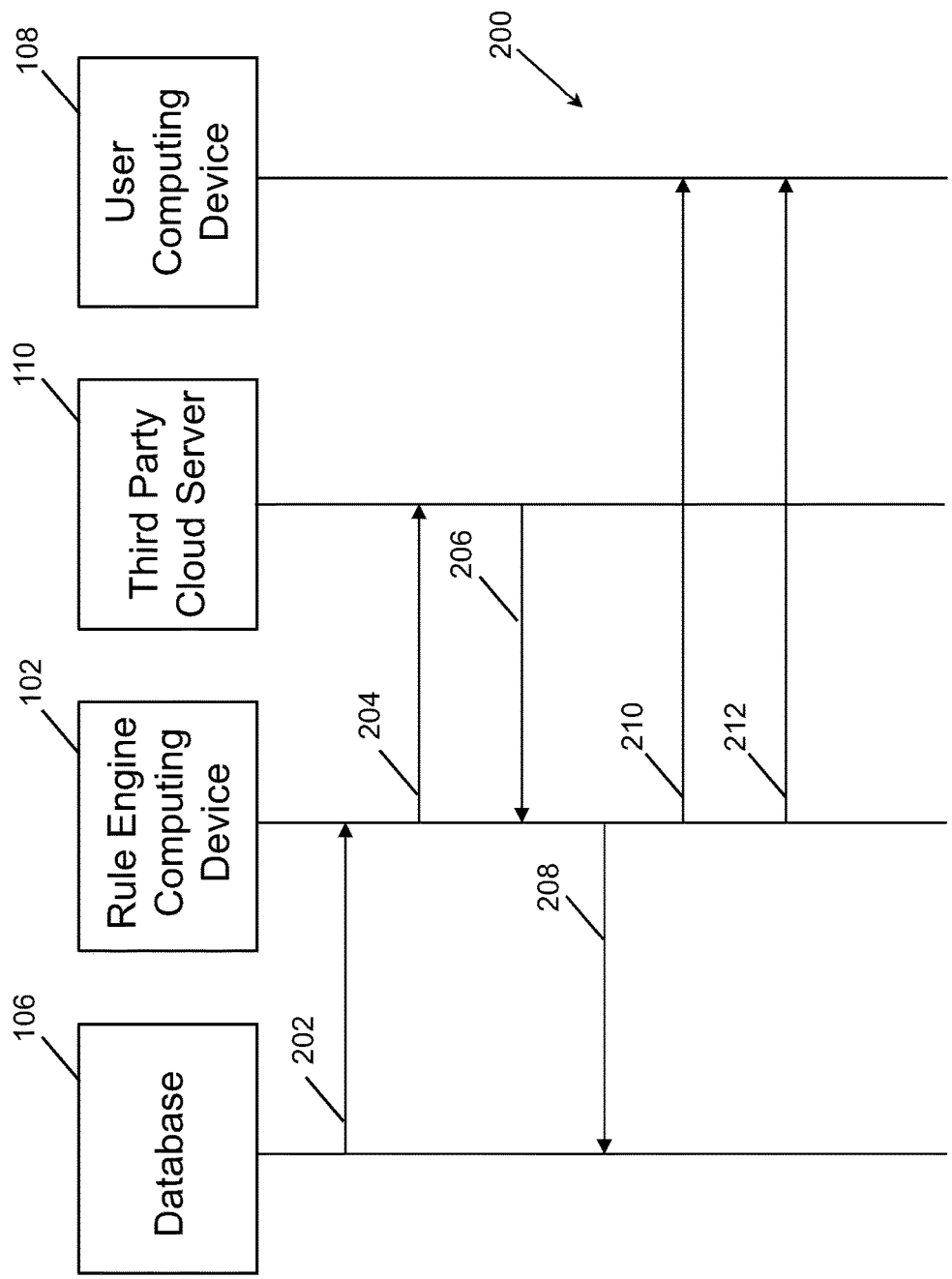
FIG. 2 illustrates a flow chart of an exemplary process that may be carried out by the computer system illustrated in FIG. 1.

FIG. 2 illustrates a flow chart of an exemplary process 200 for determining whether applications associated with a user (e.g., associated with user computing device 108) are in compliance with rules associated with the applications and displaying a dashboard including application and rule data to the user. Process 200 may be carried out by computer system 100 (shown in FIG. 1).

In the exemplary embodiment, rules engine computing device 102 retrieves rules 202 associated with a plurality of applications from database 106. For example, the applications may be applications of an insurance company that are run by third-party cloud server 110, and rules 202 may be generated by the insurance company and stored in database 106.

Rules engine computing device 102 may generate and transmit a query 204 to third-party cloud server 110 to retrieve application data 206 associated with one or more applications. For example, query 204 may retrieve application data associated with each application included in rules 202 (e.g., each application of the insurance company) and/or query 204 may retrieve application data only for applications associated with a specific user (e.g., associated with user computing device 108). Rules engine computing device 102 may generate and transmit query 204 to third-party cloud server 110 each time a predetermined time period has passed (e.g., every hour) and/or rules engine computing device 102 may generate and transmit query 204 each time a change is made to any of the applications associated with rules 202. Application data 206 may include an environment on which the application is run, encryption data associated with data stored by the application, and permissions data associated with users that can access the application. In some embodiments, application data 206 includes information for a plurality of applications in other embodiments, application data 206 is only associated with a single application.

In some embodiments, the query 204 is accessed via an API with the third-party cloud server 110, where the application data 206 includes one or more settings of the resources and/or services provided by the third-party cloud server 110. The rules engine computing device 102 compares the settings in the application data 206 to the rules 202 to determine conformance with the rules. Rules engine computing device 102 determines whether each application is in conformance with each rule 202 associated with the application by comparing rules 202 and application data 206. Conformance data 208 associated with the comparison of rules 202 and application data 206 is then transmitted to database 106 by rules engine computing device 102. For example, a setting could be that all data that is at rest (stored) is encrypted. Then the rules engine computing device 102 will check the application data 206 to confirm that that data is encrypted. Another rule may be that all passwords must be changed every 90 days. The rules engine computing device 102 may check the amount of time since each password associated with an application has been changed. In some embodiments, the rules engine computing device 102 may report every password that is past the 90-day mark. The rules engine computing device 102 may also determine how long it is until some passwords are expired and track those passwords until they either expire or are changed.

The rules engine computing device 102 may also check the settings of each application to see how long the corresponding application allows a password to be used before being changed. For example, if the rule is that a password needs to be changed every 90 days, and an application has a setting that the passwords need to be changed every 40 days, then the application is in compliance.

In some embodiments, the different rules stored in database 106 may be divided into categories. These rules may be categorized based on the corresponding control objective. Furthermore, rules engine computing device 102 may divide the rules into different buckets and/or categories to allow multiple tests to be executed simultaneously. Rules engine computing device 102 may have third-party cloud server 110 execute the tests in parallel using processing resources provided by third-party cloud server 110.

If it is determined that any of the applications associated with the user are not in conformance with one or more of rules 202 associated with the applications, rules engine computing device 102 transmits a notification 210 to user computing device 108. Notification 210 may include a message indicating which applications are not in conformance with rules 202 associated with the applications and a time period that the user has to fix the non-conformance. In some embodiments, the time period depends on a priority associated with the application not being in conformance with rules 202, as described herein.

Rules engine computing device 102 may then notify one or more individuals and/or computers that the rule is not being conformed to. In some embodiments, rules engine computing device 102 transmits notifications 210 when the violation of the rule is first seen. Rules engine computing device 102 may also transmit notifications 210 at other points, such as in a daily summary of notifications 210, one or more escalation notifications 210, and/or when remediation has or will occur. The base notifications 210 may be sent to an application owner or developer associated with the application that failed. The escalation notifications 210 refer to notifications transmitted to a supervisor after a period of time has elapsed since the violation was first seen and has not been remedied. The remediation notification refers to a notification 210 that the issue has been remediated, either by the developer, a cybersecurity professional and/or rules engine computing device 102. Rules engine computing device 102 accesses a database 106 to determine who to notify for each rule and account where a violation may occur. In many cases, these groups of individuals may overlap.

Rules engine computing device 102 further generates and transmits a dashboard 500 (shown in FIGS. 5A-5C) to be displayed by user computing device 108. Dashboard 500 may include rules data and applications data, as described further herein, especially with respect to FIGS. 5A-5C.

In some embodiments, rules engine computing device 102 may determine if the configurations and security of the applications and their corresponding data is in conformance with the stored rules. Violations of the rules may indicate that there may be one or more potential security vulnerabilities with the applications and/or data. The rules engine computing device 102 may then transmit notifications to one or more user computing devices 108 to inform the users of the potential cybersecurity vulnerabilities. In some embodiments, the notification 210 may include information for the developer to use in repairing the application or settings to stop the violation of the rules. The notification 210 may include test information describing the test that failed, evidence show that the test failed, tags of information of the actors and/or code (such as server names, workgroup details, and other information), number of times that the test has failed, when was the first failure of this test in this instance, when the escalation notification would be sent, and when a cybersecurity professional or rules engine computing device 102 may automatically remediate the issue.

The rules engine computing device 102 may also rectify the potential cybersecurity vulnerability by making one or more changes to the configuration of the application. Rules engine computing device 102 may use on of different methods to repair or remediate the issue, these include fixing the issue, quarantining the resources associated with the issue, and/or deleting the resources associated with the issue. Fixing the issue may include changing one or more settings to the proper values. In these embodiments, the developer, cybersecurity professional, and/or rules engine computing device 102 may have information to provide context of the application and thus understand enough about the application and its use to properly change the settings to allow the application to continue to run. Rules engine computing device 102 may quarantine the resources associated with the application when the rules engine computing device needs additional information about the application before changing the settings. This may include business related information about the application and/or context information. Rules engine computing device 102 may delete the resources associated with the violation when the resources are unused by any application and include one or more known vulnerabilities.

Exemplary Client Device

Figure 3:
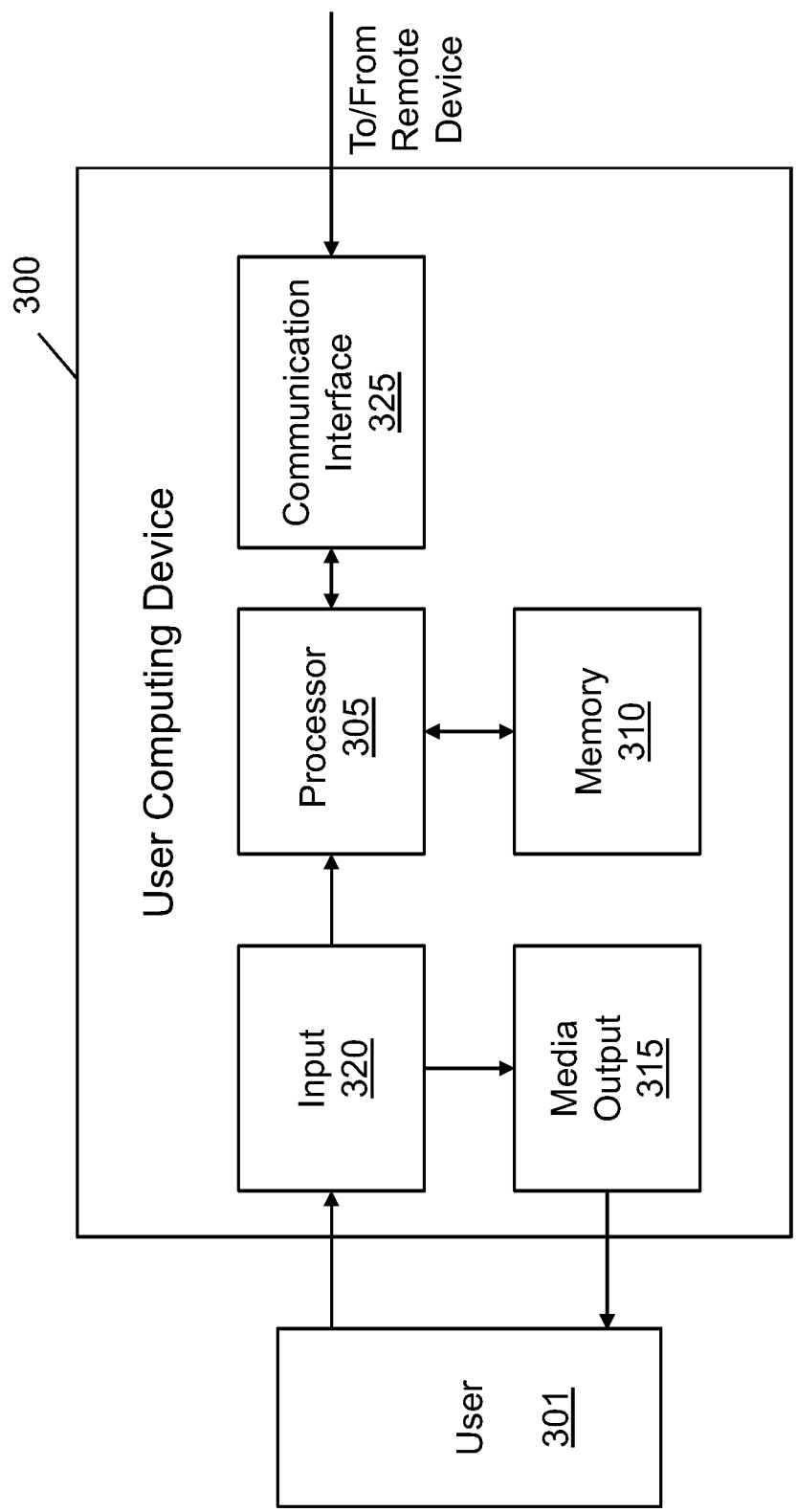
FIG. 3 illustrates an exemplary client computing device that may be used with the exemplary computer system illustrated in FIG. 1.

FIG. 3 depicts an exemplary configuration of a user computing device 300, such as user computing device 102, as shown in FIG. 1, and in accordance with one embodiment of the present disclosure. User computing device 300 may be operated by a user 301. User computing device 300 may include a processor 305 for executing instructions. In some embodiments, executable instructions may be stored in a memory area 310. Processor 305 may include one or more processing units (e.g., in a multi-core configuration).

Memory area 310 may be any device allowing information such as executable instructions to be stored and retrieved. Memory area 310 may include one or more computer readable media.

User computing device 300 may also include at least one media output component 315 for presenting information to user 301. Media output component 315 may be any component capable of conveying information to user 301. In some embodiments, media output component 315 may include an output adapter (not shown) such as a video adapter and/or an audio adapter. An output adapter may be operatively coupled to processor 305 and adapted to operatively couple to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 315 may be configured to present a graphical user interface (e.g., a web browser and/or a client application) to user 301. A graphical user interface may include, for example, a dashboard for viewing controls information and accounts information, as described below (e.g., with respect to FIGS. 5A-C). In some embodiments, user computing device 300 may include an input device 320 for receiving input from user 301. User 301 may use input device 320 to, without limitation, user identifier data and other user data, application request data, application access data, etc.

Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

User computing device 300 may also include a communication interface 325, communicatively coupled via a network to rules engine computing device 102 (shown in FIG. 1). Communication interface 325 may include, for example, a wired or wireless network adapter and/or a wireless data transceiver for use with a mobile telecommunications network.

Stored in memory area 310 are, for example, computer readable instructions for providing a user interface to user 301 via media output component 315 and, optionally, receiving and processing input from input device 320. A user interface may include, among other possibilities, a web browser and/or a client application. Web browsers enable users, such as user 302, to display and interact with media and other information typically embedded on a web page or a website.

Exemplary Server System

Figure 4:
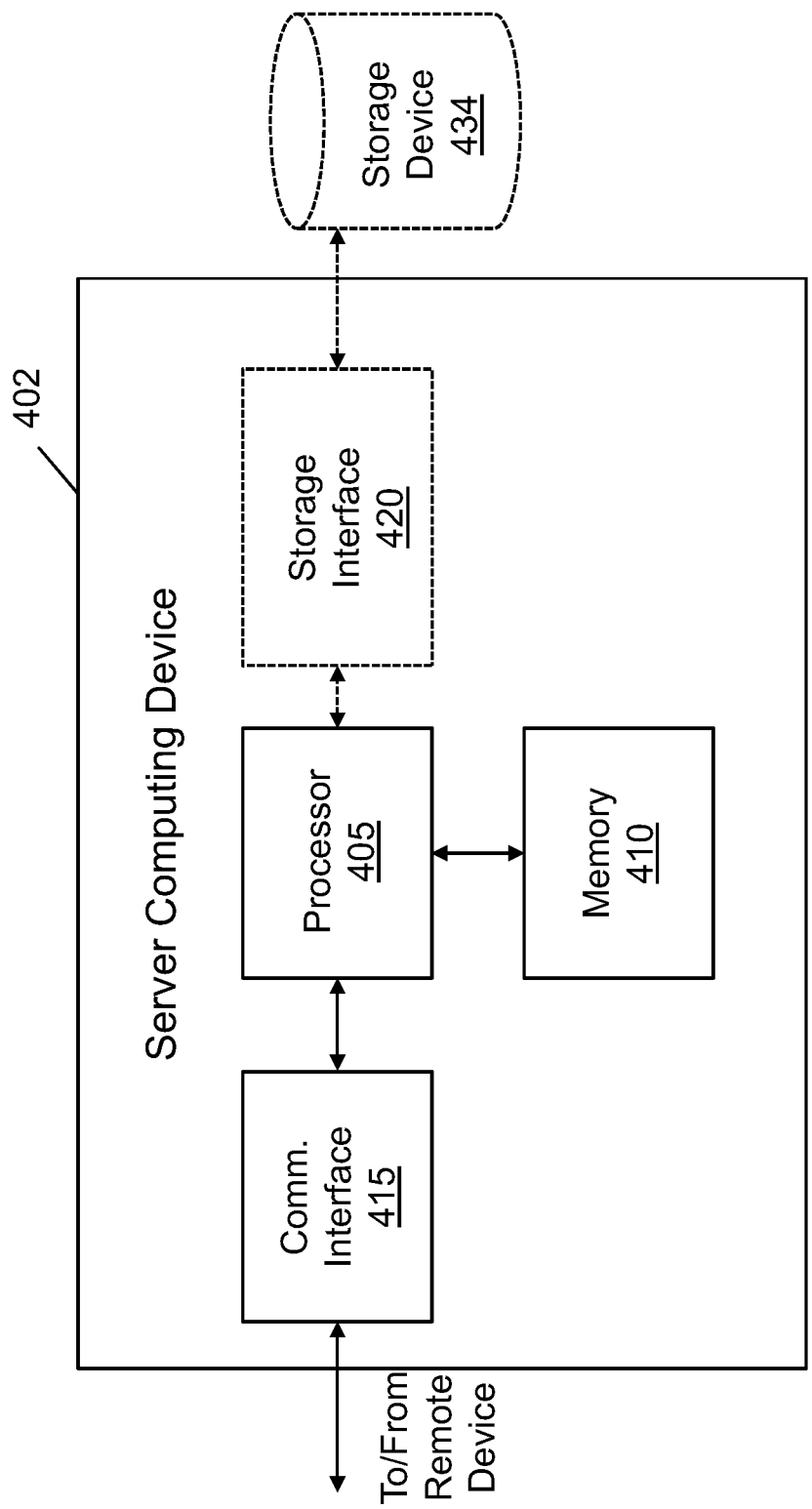
FIG. 4 illustrates an exemplary configuration of a server that may be used in the exemplary computer system illustrated in FIG. 1.

FIG. 4 depicts an exemplary server system 400 such as rules engine computing device 102, as shown in FIG. 1, and in accordance with one exemplary embodiment of the present disclosure. Accordingly, server system 400 may include a processor 405 for executing instructions. Instructions may be stored in a memory area 410. Processor 405 may include one or more processing units (e.g., in a multi-core configuration).

Processor 405 may be operatively coupled to a communication interface 415 such that server system 400 is capable of communicating with a remote computing device. For example, communication interface 415 may receive requests from client devices 108 via the Internet and/or over a computer network.

Processor 405 may also be operatively coupled to a storage device 425 (e.g., database 106, shown in FIG. 1). Storage device 425 may be any computer-operated hardware suitable for storing and/or retrieving data. In some embodiments, storage device 425 may be integrated in server system 400. For example, server system 400 may include one or more hard disk drives as storage device 425. In other embodiments, storage device 425 may be external to server system 400 and may be accessed by a plurality of server systems 400. For example, storage device 425 may include a storage area network (SAN), a network attached storage (NAS) system, and/or multiple storage units such as hard disks and/or solid-state disks in a redundant array of inexpensive disks (RAID) configuration.

In some embodiments, processor 405 may be operatively coupled to storage device 425 via a storage interface 420. Storage interface 420 may be any component capable of providing processor 405 with access to storage device 425. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 425.

Exemplary Dashboard

Figure 5A:
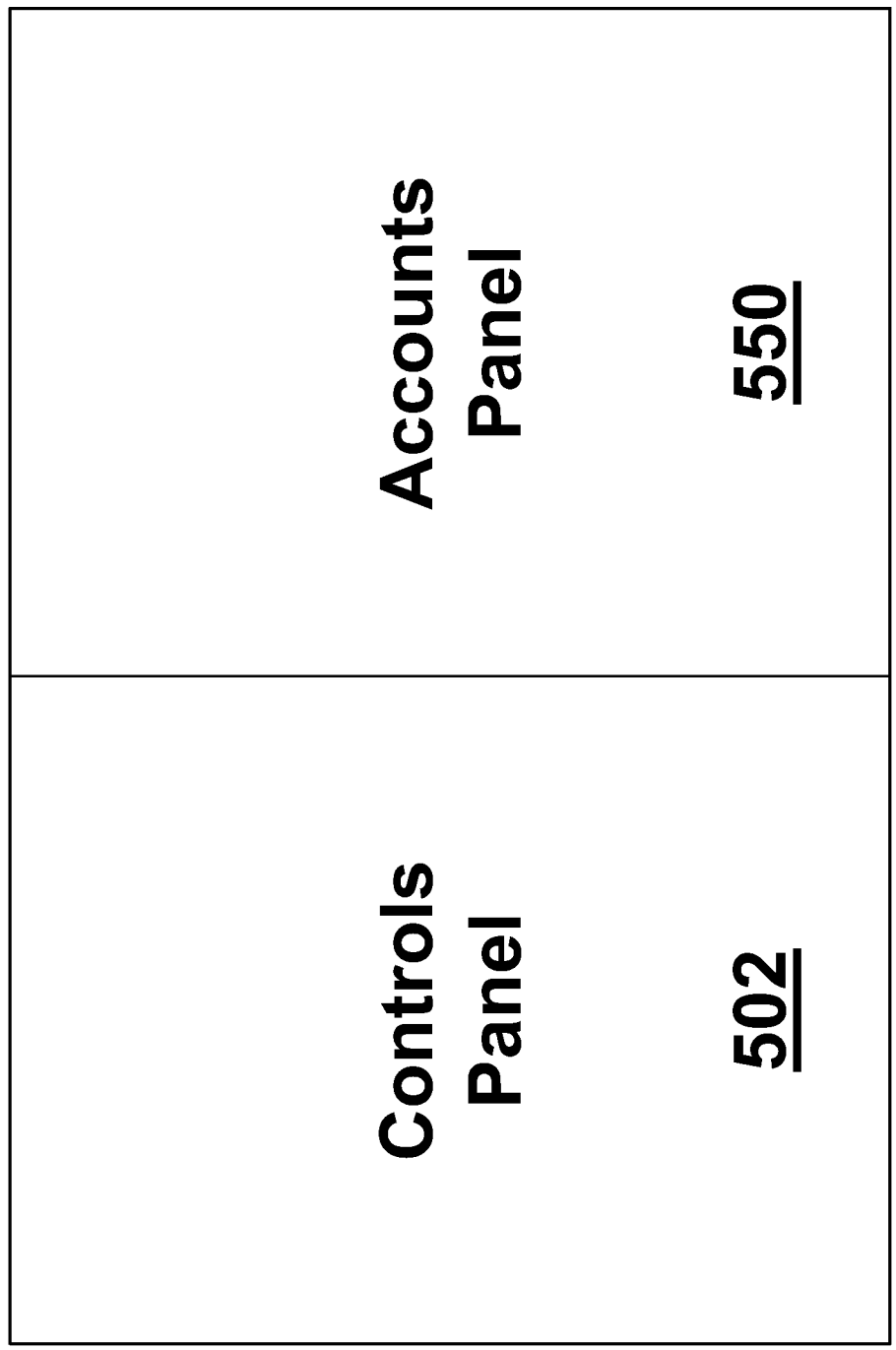
FIG. 5A illustrates an exemplary dashboard configuration of a controls panel and an accounts panel that may be output by the exemplary computer system illustrated in FIG. 1.

FIGS. 5A-5C illustrate an exemplary dashboard 500 that may be generated by a computing device (e.g., rules engine computing device 102, shown in FIG. 1) and displayed to users (e.g., through user computing devices 108, shown in FIG. 1). It should be understood that dashboard 500 is shown as an example of a dashboard that may be generated and displayed to users. Accordingly, dashboard 500 may include additional, less, or alternative information, including that described herein.

FIG. 5A illustrates a simplified version of dashboard 500 that may be displayed to users on user computing devices 108 through rules engine computing device 102. For example, dashboard 500 may be displayed to the users when the users sign into a user account associated with rules engine computing device 102. In the exemplary embodiment, the left-hand panel is a controls panel 502, and the right-hand panel is an accounts panel 550. In other embodiments, dashboard 500 may be configured differently, including, for example, a menu in which users can click to view either the controls panel 502 and/or the accounts panel 550.

FIG. 5B illustrates a detailed version of the contents of controls panel 502 of dashboard 500. Specifically, controls panel 502 includes controls details 504, a controls passing panel 506, a total controls panel 508, and a controls not passing panel 510.

Controls details 504 includes a table of controls 512 and an environment column 514, an adherence percentage 516, and a threshold percentage 518 associated with each of the controls 512. In the exemplary embodiment, environment column 514 is left blank. In other embodiments, environment column 514 may identify an environment in which the control is run and/or applicable.

In the exemplary embodiment, controls details 506 includes a graph showing the percentage of total controls that are passing and the percentage of total controls that are not passing. Further, total controls panel 508 includes a total number of controls (e.g., associated with the applications with which the user viewing dashboard 500 is associated), and controls not passing panel 510 includes a total number of controls that are not passing (e.g., are not implemented in a percentage of applications above a threshold percentage).

FIG. 5C illustrates a detailed version of the contents of applications panel 550 of dashboard 500. Specifically, applications panel 550 includes application details 552, an accounts passing panel 554, a total accounts panel 556, and an accounts not passing panel 558.

Accounts details 552 includes a bar graph showing each application associated with user viewing dashboard 500 and a number of control failures associated with each application.

In the exemplary embodiment, accounts passing panel 554 includes a graph showing the percentage of total accounts that are passing (e.g., in conformance with each rule associated with the account) and the percentage of total applications that are not passing (e.g., not in conformance with one or more rules associated with the account). Further, total accounts panel 556 includes a total number of accounts (e.g., associated with the user viewing dashboard 500), and accounts not passing panel 558 includes a total number of accounts that are not passing.

Furthermore, dashboard 500 may allow the user to dig down to receive more detail about the passed and failed rules. For example, a user may select an individual control 512 from the table of controls 512. In another example, the user may select the chart from controls passing panel 506. The user may further select the passing or the failing sections of that chart. In a further example, the user may select an individual application from the applications panel 550. Any of these selections would allow the user to receive more detail about the selected item. This information could include information about the rule that is not complied with, when the first incidence of non-compliance occurred, how many times the rule has not been complied with, when the user was notified of the issue, when the issue will be escalated, when the issue will be automatically remediated, and information about the rule and/or the failure itself.

In some embodiments, a percentage of failures is expected, or a percentage of low priority failures of compliance is expected. In these embodiments, rules engine computing device 102 may include one or more thresholds for a percentage of controls, rules, and/or accounts that may fail compliance.

Further, the rules engine computing device 102 may be used to illustrate the overall effectiveness of a control. As a control typically is assigned an owner, who is responsible for ensuring the control is effective at mitigating its intended risk, the control owner needs up to date accurate information regarding said effectiveness. The rules engine computing device 102 will show calculations illustrating the percent of applications within set thresholds for control effectiveness. If one or more applications are determined to be out of compliance, the percent of compliance would be reduced. This allows the control owner to establish set risk tolerance. The dashboard 500 will show control effectiveness (as a percent of applications within compliance) over time for historical trending perspectives. This illustration is grouped at the control objectives layer. Further, the rules engine computing device 102 may display the configuration data, rule data, and application data associated with the control to the auditor, control owner, platform owner or any governing body with a need to know. In addition, the overall platform owner (person responsible for the overall health and security of a computing platform such as a cloud service provide) is able to leverage the dashboard 500 to understand the overall health of security controls at the platform level. This information allows the platform owner to make informed decisions on the pace of adoption, volume of information stored on said platform and need for additional investment in controls.

Exemplary Computer-Implemented Method

Figure 6:
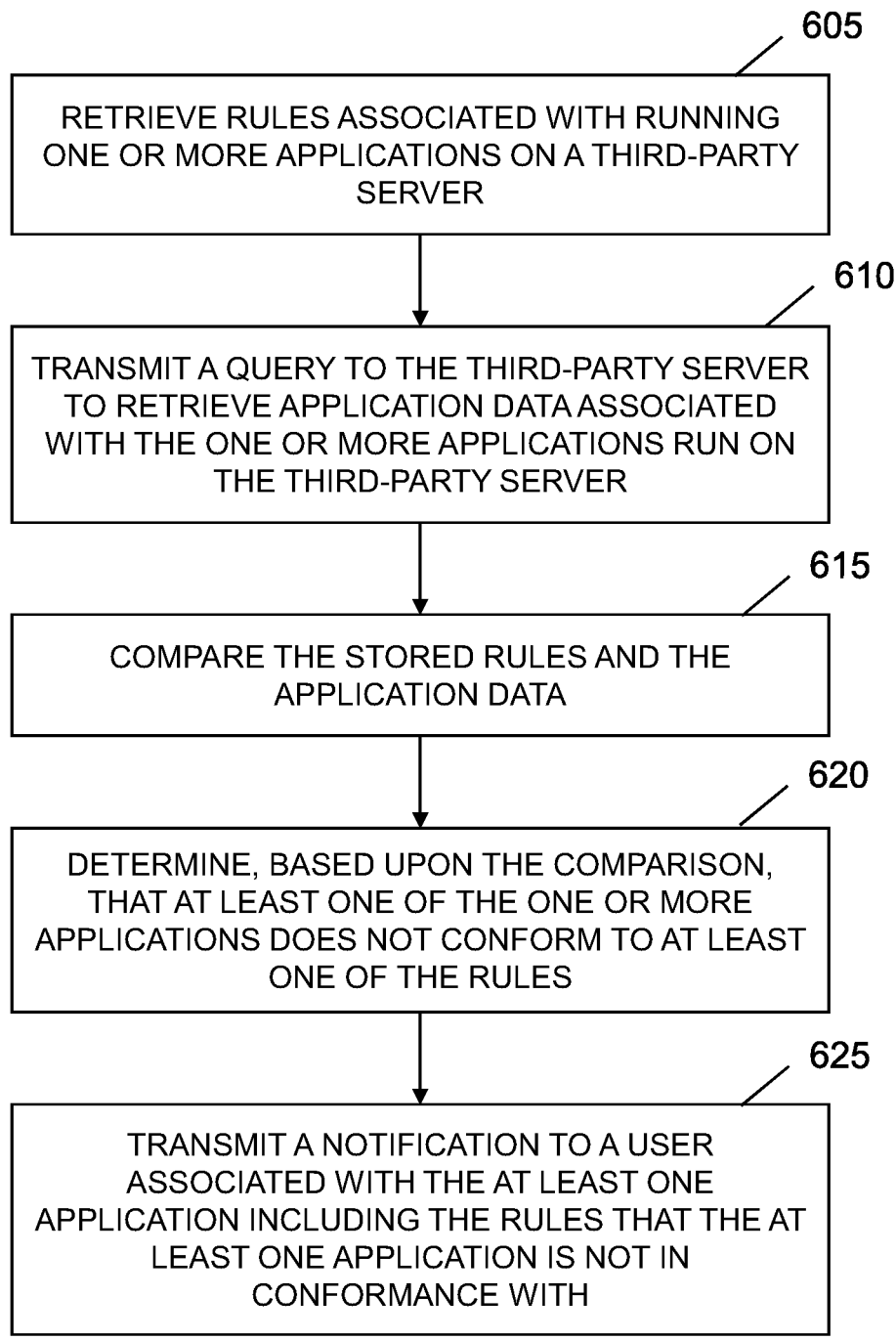
FIG. 6 illustrates a flow chart of an exemplary computer-implemented process that may be carried out by the exemplary computer system shown in FIG. 1.

FIG. 6 illustrates a flow chart of an exemplary computer-implemented process 600 for determining whether applications associated with a user are in conformance with rules associated with the applications, and displaying the determinations to a user through an efficient and user-friendly dashboard (e.g., dashboard 500, shown in FIG. 5A). Process 600 may be implemented, at least in part, by a computing device/server, for example, computer system 100 (shown in FIG. 1) and/or rules engine computing device 102 (shown in FIG. 1).

Process 600 may include retrieving 605 rules 202 (shown in FIG. 2) associated with running one or more applications on a third-party server 110 (shown in FIG. 1). The rules 202 may be stored in the database 106 (shown in FIG. 1). For example, the rules engine computing device 102 may retrieve the rules 202 associated with a plurality of applications from database 106.

Process 600 may further include transmitting 610 a query 204 to the third-party server 110 to retrieve application data 206 (both shown in FIG. 2) associated with the one or more applications run on the third-party server 110. For example, the rules engine computing device 102 may generate and transmit a query 204 to third-party cloud server 110 to retrieve application data 206 associated with one or more applications. In some embodiments, the application data 206 may include at least one of an environment on which the application is run. The application data 206 may also include encryption data that is associated with data stored by the application. The application data 206 may also include permissions data that is associated with users that can access the application. The rules 202 may include codified controls associated with the running of the applications on the third-party server 110.

Process 600 may also include comparing 615 the stored rules 202 and the application data 206. Based on the comparison, process 600 may include determining 620 that at least one of the one or more applications does not conform to at least one of the rules 202.

In addition, process 600 may include transmitting 625 a notification 210 (shown in FIG. 2) to a user associated with the at least one application including the rules 202 that the at least one application is not in conformance with. The user may receive the notification 210 on a user computing device 108 (shown in FIG. 1).

In some embodiments, the rules engine computing device 102 causes a user computing device 108 to display a dashboard 500 (shown in FIG. 5C) including each application associated with the user. The dashboard 500 may include (i) a list of each application associated with the user and a determination of whether each application is in conformance with each of the rules 202 and (ii) the notification 210 associated with the application that is not in conformance with the rules 202.

In some further embodiments, the rules engine computing device 102 determines a first rule of the rules 202. The rules engine computing device 102 causes the user computing device 108 to display a dashboard 500 including each application associated with the first rule, wherein the dashboard 500 includes (i) a list of each application associated with the first rule and a determination of whether each application is in conformance with the first rule and (ii) the notification 210 associated with the application that is not in conformance with the first rule.

In still further embodiments, the rules engine computing device 102 stores a priority of remediating each rule 202. The rules engine computing device 102 detects a violated rule based on the comparison of the stored rules 202 and the application data 206. The rules engine computing device 102 determines a priority associated with a rule with which the application is not in conformance. If the priority of remediating the violated rule is above a predetermined threshold, the rules engine computing device 102 automatically remediates the application to conform with the rule. The rules engine computing device 102 determines a time period in which the user associated with the application must remediate the application to conform with the rules 202. The time period depends on the priority. The rules engine computing device 102 transmits a notification 210 to the user associated with the application including the time period in which the user must remediate the application to conform with the rules 202. The rules engine computing device 102 determines a second time period in which to escalate that application is not in compliance with the rule 202. When the second time period has elapsed, the rules engine computing device 102 transmits an escalation notification 210 to a second user associated with the application indicating that the application is still not in compliance with the rule 202. In some embodiments, when the time period has elapsed, the rules engine computing device 102 remediates the application to conform with the rules 202. The remediation may include at least one of repair a setting associated with the rule, quarantine a resource associated with the rule, or delete a resource associated with the rule 202.

In additional embodiments, the rules engine computing device 102 stores historical application data. The historical application data includes results of previous comparisons including (i) historical configurations of the applications, (ii) the rules 202 with which the historical configurations of the applications were in non-conformance, and (iii) the notifications 210 transmitted to the user associated with the non-conforming applications. The rules engine computing device 102 may also receive an audit request. In response to the audit request, the rules engine computing device 102 retrieves the stored historical application data. The rules engine computing device 102 generates an audit report based on the stored historical application data. The rules engine computing device 102 may also display a dashboard 500 including the historical application data to the auditor.

In yet further embodiments, the rules engine computing device 102 transmits a query 204 to the third-party server 110 to retrieve application data 206 associated with a plurality of resources provided by the third-party server 110. The rules engine computing device 102 determines that one or more resources of the plurality of resources have not been used for a predetermined period of time based on the application data 206. The predetermined period of time may include at least one of 12 hours, 24 hours, two days, a week, or a month. The one or more resources may be associated with an application. The rules engine computing device 102 automatically deactivates the one or more resources that have not been in use for the predetermined period of time. The rules engine computing device 102 transmits a notification to a user associated with the application that the one or more resources have been deactivated.

Exemplary Embodiments & Functionality

In one embodiment, a computer system may be provided. The computer system may include at least one processor in communication with a memory. The at least one processor may be programmed to: (i) retrieve, from the memory, rules associated with running one or more applications on a third-party server, (ii) transmit a query to the third-party server to retrieve application data associated with the one or more applications run on the third-party server, (iii) compare the stored rules and the application data, (iv) determine, based upon the comparison, that at least one of the one or more applications does not conform to at least one of the rules, and (v) transmit a notification to a user associated with the at least one application including the rules that the at least one application is not in conformance with. The computer system may include additional, less, or alternate functionality, including that discussed elsewhere herein.

For example, the computer system may display, through a user computing device of the user, a dashboard including each application associated with the user. The dashboard may include (i) a list of each application associated with the user and a determination of whether each application is in conformance with each of the rules and (ii) the notification associated with the application that is not in conformance with the rules.

In another example, the application data may include at least one of an environment on which the application is run, encryption data associated with data stored by the application, and permissions data associated with users that can access the application. The rules may include codified controls associated with the running of the applications on the third-party server. The application data may also include a plurality of settings for the third-party server for executing a first application.

Furthermore, the computer system may determine a first rule of the rules. The computer system may then display, through a user computing device of the user, a dashboard including each application associated with the first rule. The dashboard may include (i) a list of each application associated with the first rule and a determination of whether each application is in conformance with the first rule and (ii) the notification associated with the application that is not in conformance with the first rule.

In addition, the computer system may store a priority of remediating each rule. The computer system may then detect a violated rule based on the comparison of the stored rules and the application data. If the priority of remediating the violated rule is above a predetermined threshold, the computer system may automatically remediate the application to conform with the rule.

Moreover, the computer system may determine a priority associated with a rule with which the application is not in conformance. The computer system may also determine a time period in which the user associated with the application must remediate the application to conform with the rules. The time period may depend on the priority. The computer system may then transmit a notification to the user associated with the application including the time period in which the user must remediate the application to conform with the rules. In addition, the computer system may determine a second time period in which to escalate that application is not in compliance with the rule. When the second time period has elapsed, the computer system may transmit an escalation notification to a second user associated with the application indicating that the application is still not in compliance with the rule. When the time period has elapsed, the computer system remediate the application to conform with the rules. The remediation may include at least one of repair a setting associated with the rule, quarantine a resource associated with the rule, or delete a resource associated with the rule.

Furthermore, the computer system may store, in the memory, historical application data. The historical application data may include results of previous comparisons including (i) historical configurations of the applications, (ii) the rules with which the historical configurations of the applications were in non-conformance, and (iii) the notifications transmitted to the user associated with the non-conforming applications.

The computer system may receive an audit request. In response to the audit request, the computer system may retrieve the stored historical application data. The computer system may then generate an audit report based on the stored historical application data. The computer system may then display a dashboard including the historical application data to the auditor.

In addition, the computer system may transmit a query to the third-party server to retrieve application data associated with a plurality of resources provided by the third-party server. The computer system may then determine that one or more resources of the plurality of resources have not been used for a predetermined period of time based on the application data. The predetermined period of time may include at least one of 12 hours, 24 hours, two days, a week, or a month. The one or more resources may be associated with an application. The computer system may automatically deactivate the one or more resources that have not been in use for the predetermined period of time. The computer system may then transmit a notification to a user associated with the application that the one or more resources have been deactivated.

In another embodiment, a method may be provided. The method may be implemented by a computer device including at least one processor in communication with a memory. The method may include: (i) retrieving, from the memory, rules associated with running one or more applications on a third-party server, (ii) transmitting a query to the third-party server to retrieve application data associated with the one or more applications run on the third-party server, (iii) comparing the stored rules and the application data, (iv) determining, based upon the comparison, that at least one of the one or more applications does not conform to at least one of the rules, and (v) transmitting a notification to a user associated with the at least one application including the rules that the at least one application is not in conformance with. The method may include additional, less, or alternative actions, including those discussed elsewhere herein.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, vehicle telematics, autonomous vehicle, and/or intelligent home telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

ADDITIONAL CONSIDERATIONS

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied, or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps," or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computer system comprising at least one processor in communication with a memory, the at least one processor programmed to:
    transmit a query to a third-party server to retrieve application data associated with a plurality of resources provided by the third-party server;
    determine that one or more resources of the plurality of resources have not been used for a predetermined period of time based on the application data, wherein the one or more resources are associated with an application;
    automatically deactivate the one or more resources that have not been in use for the predetermined period of time; and
    transmit a notification to a user associated with the application that the one or more resources have been deactivated.

2. The computer system of claim 1, wherein the at least one processor is further programmed to:
    retrieve, from the memory, rules associated with running one or more applications on the third-party server;
    transmit a query to the third-party server to retrieve application data associated with the one or more applications run on the third-party server;
    compare the stored rules and the application data;
    determine, based upon the comparison, that at least one of the one or more applications does not conform to at least one of the rules; and
    transmit a notification to a user associated with the at least one application including the rules that the at least one application is not in conformance with.

3. The computer system of claim 2, wherein the at least one processor is further programmed to:
    store a priority of remediating each rule;
    detect a violated rule based on the comparison of the stored rules and the application data; and
    if the priority of remediating the violated rule is above a predetermined threshold, automatically remediate the application to conform with the rule.

4. The computer system of claim 1, wherein the at least one processor is further programmed to display, through a user computing device of the user, a dashboard including each application associated with the user, wherein the dashboard includes (i) a list of each application associated with the user and a determination of whether each application is in conformance with each of the rules and (ii) the notification associated with the application that is not in conformance with stored rules.

5. The computer system of claim 1, wherein the at least one processor is further programmed to:
    determine a first rule of the rules; and
    display, through a user computing device of the user, a dashboard including each application associated with the first rule, wherein the dashboard includes (i) a list of each application associated with the first rule and a determination of whether each application is in conformance with the first rule and (ii) the notification associated with the application that is not in conformance with the first rule.

6. The computer system of claim 1, wherein the at least one processor is further programmed to:
    determine a priority associated with a rule with which the application is not in conformance;
    determine a time period in which the user associated with the application must remediate the application to conform with the rules, wherein the time period depends on the priority; and
    transmit a notification to the user associated with the application including the time period in which the user must remediate the application to conform with the rules.

7. The computer system of claim 6, wherein the at least one processor is further programmed to:
    determine a second time period in which to escalate that application is not in compliance with the rule; and
    when the second time period has elapsed, transmit an escalation notification to a second user associated with the application indicating that the application is still not in compliance with the rule.

8. The computer system of claim 6, wherein when the time period has elapsed the at least one processor is further programmed to remediate the application to conform with the rules.

9. The computer system of claim 8, wherein the remediation includes at least one of repair a setting associated with the rule, quarantine a resource associated with the rule, or delete a resource associated with the rule.

10. The computer system of claim 1, wherein the at least one processor is further programmed to store, in the memory, historical application data, wherein the historical application data includes results of previous comparisons including (i) historical configurations of the applications, (ii) stored rules with which the historical configurations of the applications were in non-conformance, and (iii) the notifications transmitted to the user associated with the non-conforming applications.

11. The computer system of claim 10, wherein the at least one processor is further programmed to:
    receive an audit request;
    in response to the audit request, retrieve the stored historical application data; and
    generate an audit report based on the stored historical application data.

12. The computer system of claim 11, wherein the at least one processor is further programmed to display a dashboard including the historical application data to the auditor.

13. The computer system of claim 1, wherein the predetermined period of time includes at least one of 12 hours, 24 hours, two days, a week, or a month.

14. The computer system of claim 1, wherein the application data includes at least one of an environment on which the application is run, encryption data associated with data stored by the application, and permissions data associated with users that can access the application, and wherein stored rules include codified controls associated with the running of the applications on the third-party server.

15. The computer system of claim 1, wherein the application data includes a plurality of settings for the third-party server for executing a first application.

16. A method to be implemented by a computer device including at least one processor in communication with a memory, the method comprising:
   transmitting a query to a third-party server to retrieve application data associated with a plurality of resources provided by the third-party server;
   determining that one or more resources of the plurality of resources have not been used for a predetermined period of time based on the application data, wherein the one or more resources are associated with an application;
   automatically deactivating the one or more resources that have not been in use for the predetermined period of time; and
   transmitting a notification to a user associated with the application that the one or more resources have been deactivated.

17. The method of claim 16 further comprising:
   retrieving, from the memory, rules associated with running one or more applications on the third-party server;
   transmitting a query to the third-party server to retrieve application data associated with the one or more applications run on the third-party server;
   comparing the stored rules and the application data;
   determining, based upon the comparison, that at least one of the one or more applications does not conform to at least one of the rules; and
   transmitting a notification to a user associated with the at least one application including the rules that the at least one application is not in conformance with.

18. The method of claim 17 further comprising: displaying, through a user computing device of the user, a dashboard including each application associated with the user, wherein the dashboard includes (i) a list of each application associated with the user and a determination of whether each application is in conformance with each of the rules and (ii) the notification associated with the application that is not in conformance with the rules.

19. The method of claim 16 further comprising:
   storing, in the memory, historical application data, wherein the historical application data results of previous comparisons including (i) historical configurations of the applications, (ii) stored rules with which the historical configurations of the applications were in non-conformance, and (iii) the notifications transmitted to the user associated with the non-conforming applications;
   receiving an audit request;
   in response to the audit request, retrieving the stored historical application data; and
   generating an audit report based on the stored historical application data.

20. The method of claim 16 further comprising:
   determining a priority associated with a rule with which the application is not in conformance;
   determining a time period in which the user associated with the application must remediate the application to conform with the rules, wherein the time period depends on the priority; and
   transmitting a notification to the user associated with the application including the time period in which the user must remediate the application to conform with the rules.

21. The method of claim 16 further comprising:
   storing a priority of remediating each rule;
   detecting a violated rule based on a comparison of the stored rules and the application data; and
   if the priority of remediating the violated rule is above a predetermined threshold, automatically remediating the application to conform with the rule.

22. At least one non-transitory computer-readable storage media having computer-executable instructions embodied thereon, wherein when executed by at least one processor, the computer-executable instructions cause the processor to:
   transmit a query to a third-party server to retrieve application data associated with a plurality of resources provided by the third-party server;
   determine that one or more resources of the plurality of resources have not been used for a predetermined period of time based on the application data, wherein the one or more resources are associated with an application;
   automatically deactivate the one or more resources that have not been in use for the predetermined period of time; and
   transmit a notification to a user associated with the application that the one or more resources have been deactivated.

* * * * *